July 7, 1931. C. E. IMEL ET AL 1,813,354
BEET HARVESTER
Filed June 3, 1930 4 Sheets-Sheet 1

Inventors
C. E. Imel
B. E. Barner
By Clarence A. O'Brien
Attorney

July 7, 1931. C. E. IMEL ET AL 1,813,354
BEET HARVESTER
Filed June 3, 1930 4 Sheets-Sheet 2

Inventors
C. E. Imel
R. E. Barker
By Clarence A. O'Brien
Attorney

July 7, 1931. C. E. IMEL ET AL 1,813,354
BEET HARVESTER
Filed June 3, 1930   4 Sheets-Sheet 3

Inventors
C. E. Imel
R. E. Barker
By Clarence A. O'Brien
Attorney

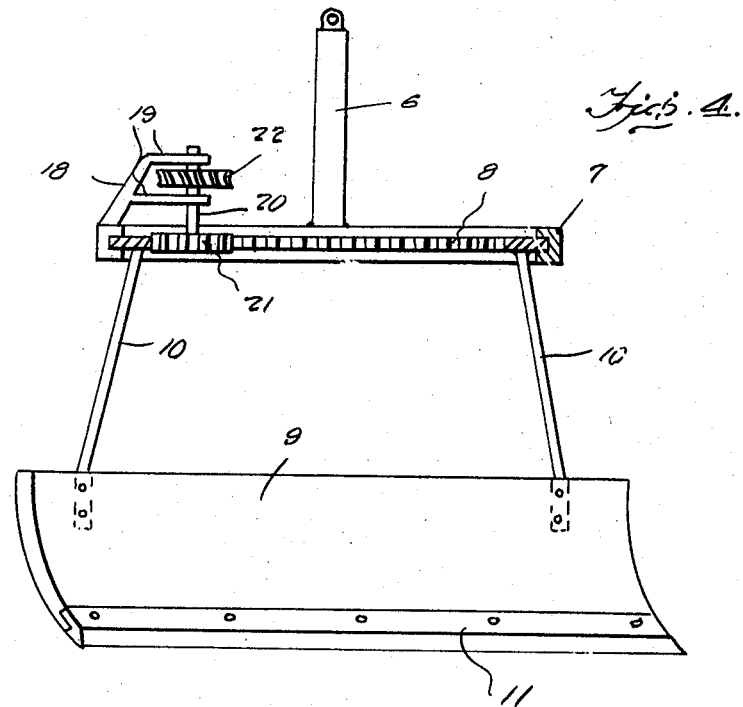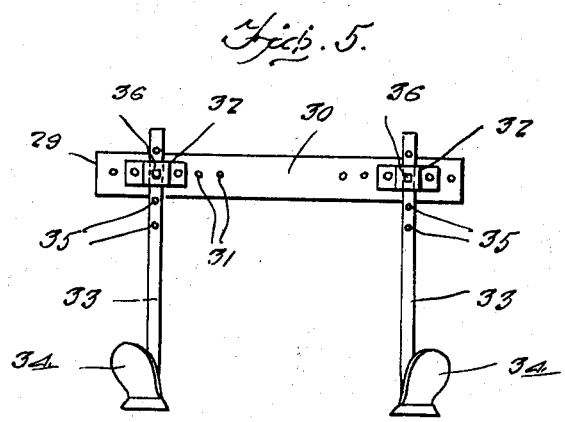

Patented July 7, 1931

1,813,354

UNITED STATES PATENT OFFICE

CASSIUS ERNST IMEL AND RAY EDGAR BARKER, OF ERIE, COLORADO

BEET HARVESTER

Application filed June 3, 1930. Serial No. 459,036.

This invention relates to agricultural machines and more particularly to new and useful improvements in beet harvesters.

An important object of the invention is to provide, in a manner as hereinafter set forth, a beet harvester embodying means for topping the beets prior to the removal thereof from the ground, said topping means including an elongated knife adjustably mounted on the supporting frame in a manner to be expeditiously adjusted to any desired angle with respect to the line of travel of the machine.

Another important object of the invention is to provide a beet harvester of the character described embodying novel means for removing the topped beets from the ground and depositing the same on an elevator to be discharged into a suitable receptacle or hopper.

A further important object of the invention is to provide a beet harvester of the aforementioned character which is adapted to be mounted for operation on the frame of a conventional farm tractor without the necessity of materially altering said tractor.

Other objects of the invention are to provide a beet harvester which will be simple in construction, strong, durable, efficient in its use and which may be manufactured at low cost.

All of the foregoing and still further objects and advantages of the invention may become apparent from the following specification, taken in connection with the accompanying drawings wherein like characters of reference designate corresponding parts throughout the several views, and wherein:—

Figure 4 is a sectional view showing the manner of rotatably mounting and adjusting the topping knife.

Figure 5 is a detail view in elevation showing the shovels or plows which throw the earth away from the opposite sides of the row of beets being harvested.

Figure 1:
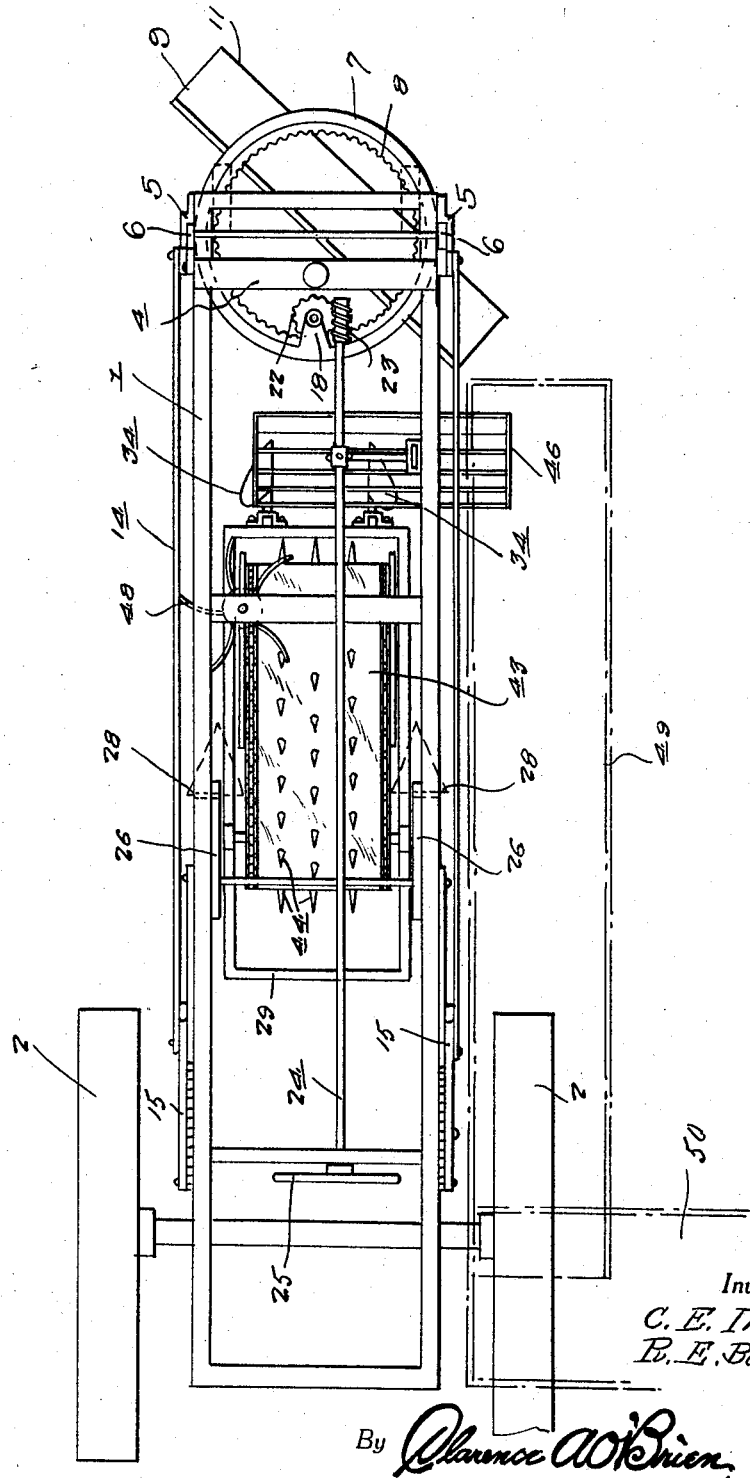
Figure 1 is a view in top plan of a beet harvester constructed in accordance with this invention.

Referring to the drawings in detail, it will be seen that the reference numeral 1 designates what may be a conventional tractor frame having the rear drive wheels 2 and the front steering wheels 3. The reference numeral 4 designates the radiator of the tractor.

Vertically disposed guide brackets 5 are mounted on the opposite sides of the forward end portion of the tractor frame 1 and mounted for vertical sliding movement through said brackets 5 are the bars 6 which have their lower ends secured to diametrically opposite sides of an internally channeled annulus 7 in which is rotatably mounted a ring gear 8 the teeth of which are disposed on the inner periphery thereof. As illustrated to advantage in Figure 4 of the drawings, a plate 9 of arcuate cross section is rigidly suspended from the ring gear 8 through the medium of the rods or hangers 10. A cutting blade 11 is secured to the lower edge of the plate 9 by any suitable means and said blade 11 constitutes a topping knife. A pair of bell crank levers 12 are pivotally mounted, through the medium of the brackets 13 on opposite sides of the radiator 4 in vertically spaced relation to the frame 1 and said bell crank levers have the free ends of one arm pivotally connected to the upper end of the adjacent bar 6. It may be well to here state that the guide brackets 5 are large to permit slight lateral movement of the bar 6 therein to compensate for the arc of the bell crank levers 12 when said bell crank levers are actuated in a manner to shift said bars 6 vertically. An elongated rod 14 has one end connected to the bell crank levers 12 and its opposite end connected to a hand lever 15 mounted at a point convenient for actuation by the operator of the tractor. An intermediate portion of the lever is pivotally connected to a suitable support as at 16, the lower end portion of said lever 15 extending below the pivot point. A toothed segment 17 is operatively associated with the lever 15 to receive a conventional latch on said lever for retaining the same against swinging movement.

Referring again to Figure 4 of the drawings it will be seen that a bracket 18 is mounted on the annulus 7 and includes the inwardly extending horizontally disposed arms 19 through which the vertically disposed stub shaft 20 is journaled. A gear 21 is fixed on the lower end portion of the stub shaft 20 and said gear is in constant mesh with the ring gear 8. A ring gear 22 is fixed on the stub shaft 20 intermediate the arms 19 of the bracket 18 and is in mesh with a worm gear 23 fixed on the adjacent end portion of a shaft 24 which is rotatably mounted on the frame 1 and extends rearwardly and has fixed on its rear end portion an actuating wheel 25.

It will thus be seen that upon actuation of the hand lever 15, the topping knife may be expeditiously adjusted vertically with respect to the ground and secured in adjusted position. By actuating the wheel 25 the cutting knife may be rotated in a horizontal plane in a manner to adjust the angle thereof with respect to the direction of travel of the machine, as will be readily apparent. In referring to the lever 15, it is, of course, the pair of levers mounted on each side of the frame 1 as best illustrated in Figure 1 of the drawings, each of said levers being connected to one of the bell crank levers 12 through the medium of the rods 14.

Figure 2:
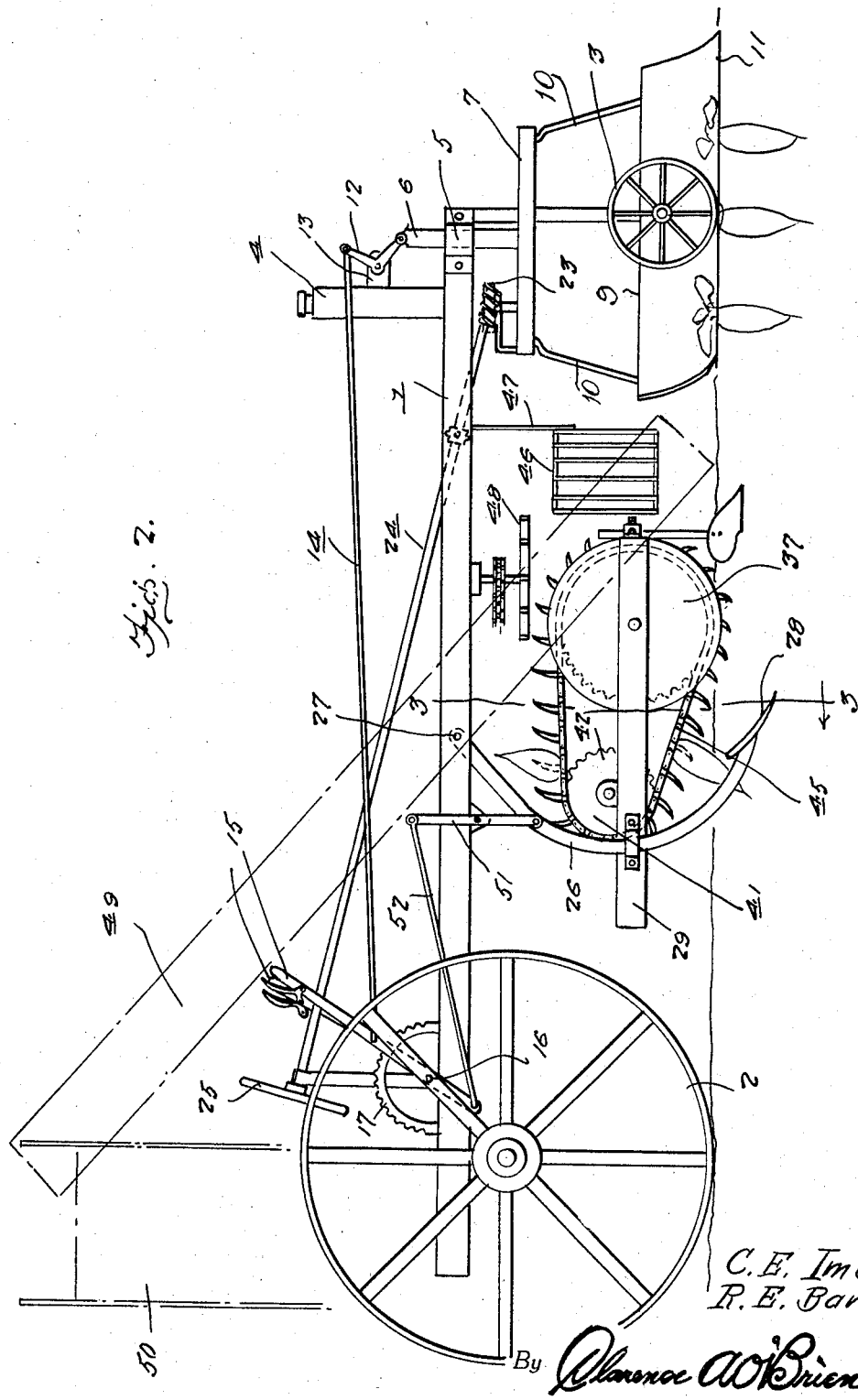
Figure 2 is a view in side elevation thereof.
Figure 3:
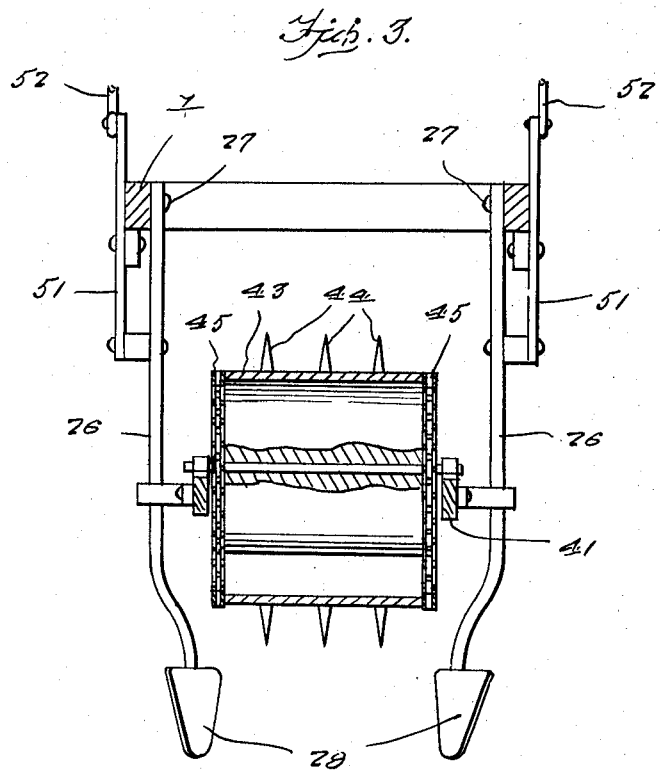
Figure 3 is a vertical cross sectional view taken substantially on the line 3—3 of Figure 2 looking in the direction indicated by the arrows.
Figure 6:
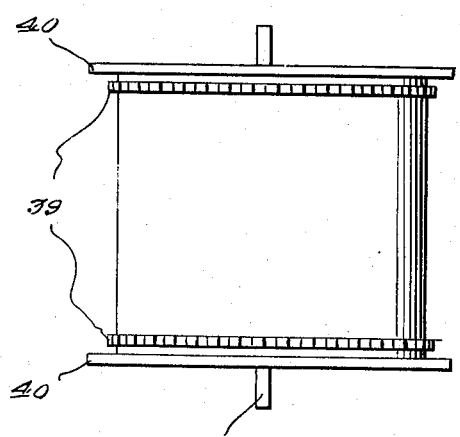
Figure 6 is a detail view in top plan showing the ground engaging drum over which the spike supporting endless chains are trained.

A pair of arcuate arms 26 are pivotally connected as at 27 to an intermediate portion of the opposite sides of the frame 1, said arms being longitudinally curved as clearly illustrated in Figure 2 of the drawings and having fixed on their free ends the beet lifters 28. A substantially rectangular frame 29 is disposed between the arms 26 and loosely connected thereto and extending forwardly therefrom. As best seen in Figure 5 of the drawings, the forward cross member 30 of the frame 29 has its opposite end portion provided with a series of openings 31 for adjustably mounting the brackets 32 thereon through which the standards 33 of the shovels or plows 34 extend for vertical adjustment. Said standards 33 being provided with the spaced openings 35 for the reception of a bolt 36 threaded through the brackets 32 for securing the standards and the shovels or plows 34 in vertically adjusted position. A comparatively large drum 37 is mounted for rotation in the forward end portion of the frame 29 through the medium of the transversely extending shafts 38 and said drum has mounted thereon adjacent its opposite ends the sprocket gears 39. As illustrated to advantage in Figures 2 and 6 of the drawings, the drum 37 further includes the traction flanges 40 on its opposite end portions which are adapted to travel in the furrow left by the adjacent shovel or plow 34 and impart rotary movement to said drum 37. A comparatively small drum 41 is mounted for rotation on the frame 29 in rearwardly spaced relation to the drum 37 and in longitudinal alignment therewith and has fixed on its opposite end the sprocket gears 42. An endless belt 43 is trained over the drums 37 and 41 and has mounted thereon and projecting outwardly therefrom the beet engaging prongs or spikes 44. Fixed on the opposite marginal edges of the belt 43 is a pair of sprocket chains 45 which are trained over the sprocket gears on the drums 37 and 41 for providing positive driving means for the belt 43. The arms 26 converge toward their free ends in a manner to dispose the lifters 28 inwardly of the shovels or plows 34 and in spaced opposed relation below the prongs or spikes 44 on the endless belt 43.

A slatted inclined chute 46 is suspended from the frame 1 through the medium of the hangers 47 and is disposed forwardly of the drum 37 in a manner to receive beets from the endless belt 43. A horizontally disposed rotatable kicker 48 is operatively mounted above the drum 37 for removing the beets which have been impaled on the spikes or prongs 44 and precipitating the same on to the slatted chute 46. The chute 46 has its discharge end disposed above the lower end portion of a conventional inclined conveyor 49 which has its upper end disposed above a chute 50 which may deposit the beets in any suitable container which may be mounted on a vehicle which travels with the harvester. The kicker 48 may be operatively connected with any suitable source of power for actuation thereby.

In use, the topping knife is adjusted vertically to the desired position and also swung or rotated in a horizontal plane to the desired angle. As the machine moves over the row of beets the knife severs the tops therefrom and said tops are swept to the land side of the machine out of the path of the beet lifting mechanism. The shovels or plows 34 travel closely adjacent the opposite side of the row of beets and throw the earth outwardly therefrom. As before stated, the shovels 34 may be adjusted on the frame 29 by reason of the series of holes 31 to adapt the same for operation on rows of beets of various sizes. The traction flanges 40 of the drum 37 follow in the furrows left by the shovels or plows 34 and, as before stated, rotary movement is imparted to said drum and to the endless belt 43 in this manner. As the drum travels over the row of beets, the prongs or spikes 44 are driven into the beets in a manner to impale the same thereon and as the prongs or spikes begin to move upwardly toward the comparatively small drum 41 and away from the ground, the lifters 28 engage beneath the beets and force the same upwardly against the belt 43 and retain the same on the spikes.

When the beets pass to the rear of the lifters 28, the same are practically free of the ground and are carried upwardly and then forwardly over the drums 41 and 37. When they reach the drum 37, the kicker 48 engages the beets and precipitates the same on to the inclined chute 46 where said beets move by gravity on to the conveyor 49 and are discharged into the chute 50. The conveyor 49 is preferably of the conventional slatted type and by reason of this fact any loose dirt which may cling to the beets will be removed therefrom as the same pass over the chute 46 and the conveyor 49. The arms 26 which carry the lifters 28 are operatively connected to the levers 15 for actuation thereby through the medium of the levers 51 and the connecting rods 52.

It is believed that the many advantages of a beet harvester constructed in accordance with this invention will be readily understood, and although the preferred embodiment of the invention is as illustrated and described, it is to be understood that changes in the details of construction may be had which will fall within the scope of the invention as claimed.

What is claimed is:—

1. A beet harvester of the character described comprising a wheeled supporting frame, an annulus mounted for vertical adjustment on the forward end portion of the supporting frame, a ring gear rotatably mounted on the annulus, a topping knife rigidly suspended from the ring gear, and means mounted on the supporting frame and disposed rearwardly of the topping knife for lifting the beets out of the ground.

2. A beet harvester of the character described comprising a wheeled supporting frame, an annular horizontally disposed internally channeled annulus mounted for vertical adjustment on the forward end portion of the supporting frame, a ring gear rotatably mounted in the channel of the annulus, a horizontally disposed topping knife rigidly suspended from the ring gear, manually operable means for rotating the ring gear in a manner to adjust the angularity of the topping knife with respect to the line of travel of the machine, manually operable means for shifting the annulus vertically in a manner to adjust the topping knife vertically with respect to the ground, and means mounted on the supporting frame and disposed rearwardly of the topping knife for lifting the beets out of the ground.

3. A beet harvester of the character described comprising a wheeled supporting frame, vertically disposed guide brackets mounted on the opposite sides of the forward end portion of the supporting frame, a horizontally disposed internally channeled annulus, upstanding bars rigidly mounted on diametrically opposite sides of the annulus for slidable insertion through the guide brackets, a ring gear mounted for rotary movement in the channel of the annulus, hangers rigidly connected to the ring gear on diametrically opposite sides thereof and depending therefrom, an arcuate plate rigidly mounted on the lower end portions of the hangers, a topping knife mounted on the lower marginal portion of the plate, manually operable means for shifting the bars vertically in the guide brackets in a manner to adjust the topping knife vertically with respect to the ground, manually operable means connected with the ring gear for rotating the same in a manner to rotate the topping knife in a horizontal plane for adjusting the angularity thereof with respect to the line of travel of the harvester and means operatively mounted on the frame and disposed rearwardly of the topping knife for engaging the beets and lifting the same out of the ground.

4. A beet harvester of the character described comprising a wheeled supporting frame, a topping knife mounted for vertical and horizontal adjustment on the forward end portion of the supporting frame, manually operable means for adjusting the topping knife, another frame disposed beneath an intermediate portion of the first named frame, and rearwardly of the topping knife, a pair of oppositely disposed, transversely spaced shovels mounted on the forward end of the second named frame, a comparatively large drum mounted for rotation in the forward end portion of the second named frame, a comparatively small drum mounted for rotation in the second named frame in rearwardly spaced relation to the first named drum, an endless belt trained over the drums, beet engaging spikes mounted on the endless belt and projecting therefrom, sprocket gears mounted on the opposite end portions of each of the drums, sprocket chains mounted on the opposite marginal edges of the endless belt and trained over the sprocket gears on the drums for actuation thereby, an annular ground engaging flange formed on each end of the first named drum for imparting rotation thereto, lifting devices mounted on the frame and disposed beneath the endless belt for engagement with the beets in a manner to shift the same toward the belt, means disposed above the belt for removing the beets therefrom and conveying means associated with the belt to receive the beets and convey the same away.

In testimony whereof we affix our signatures.

CASSIUS ERNST IMEL.
RAY EDGAR BARKER.